Jan. 10, 1956  B. RONAY  2,730,599
PRESSURE WELDING BY INDUCTION HEATING
Filed July 3, 1952  3 Sheets-Sheet 1
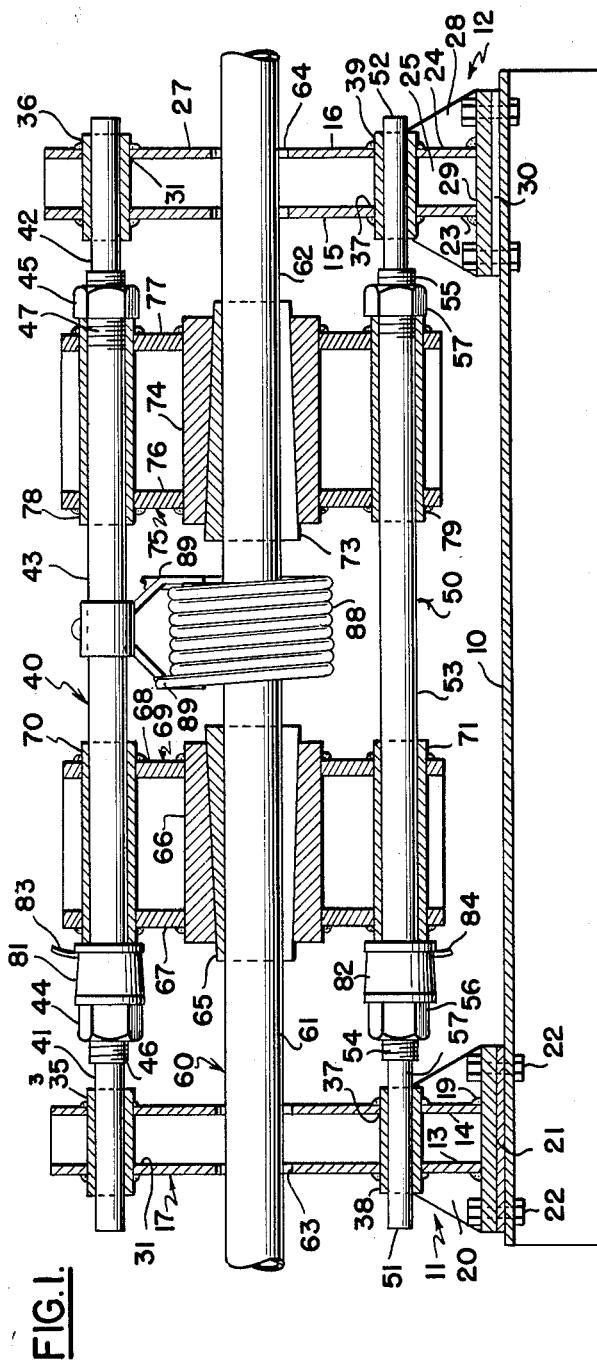
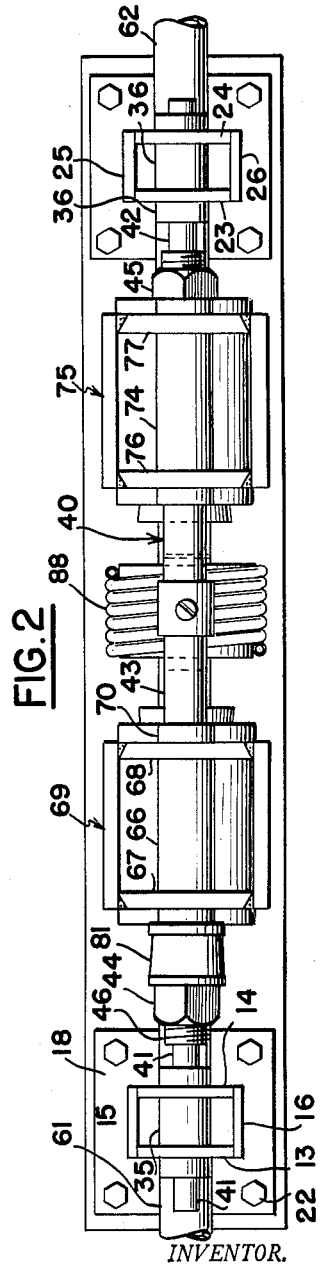
INVENTOR.
Bela Ronay
BY
Attorney

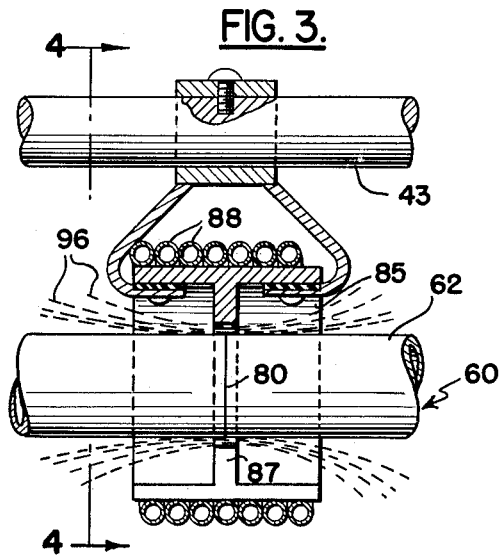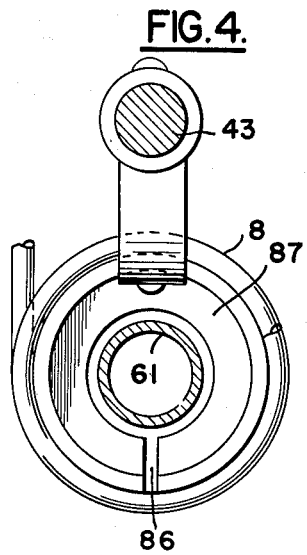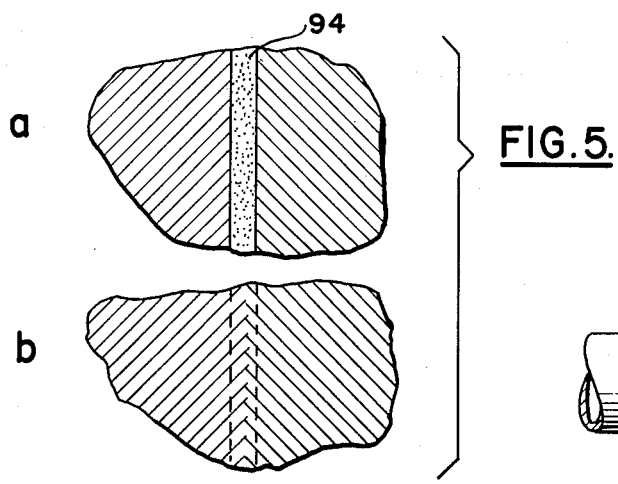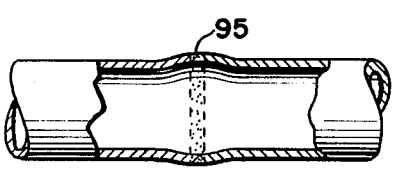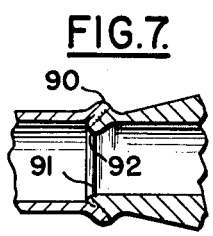

Jan. 10, 1956  B. RONAY  2,730,599
PRESSURE WELDING BY INDUCTION HEATING
Filed July 3, 1952  3 Sheets-Sheet 3
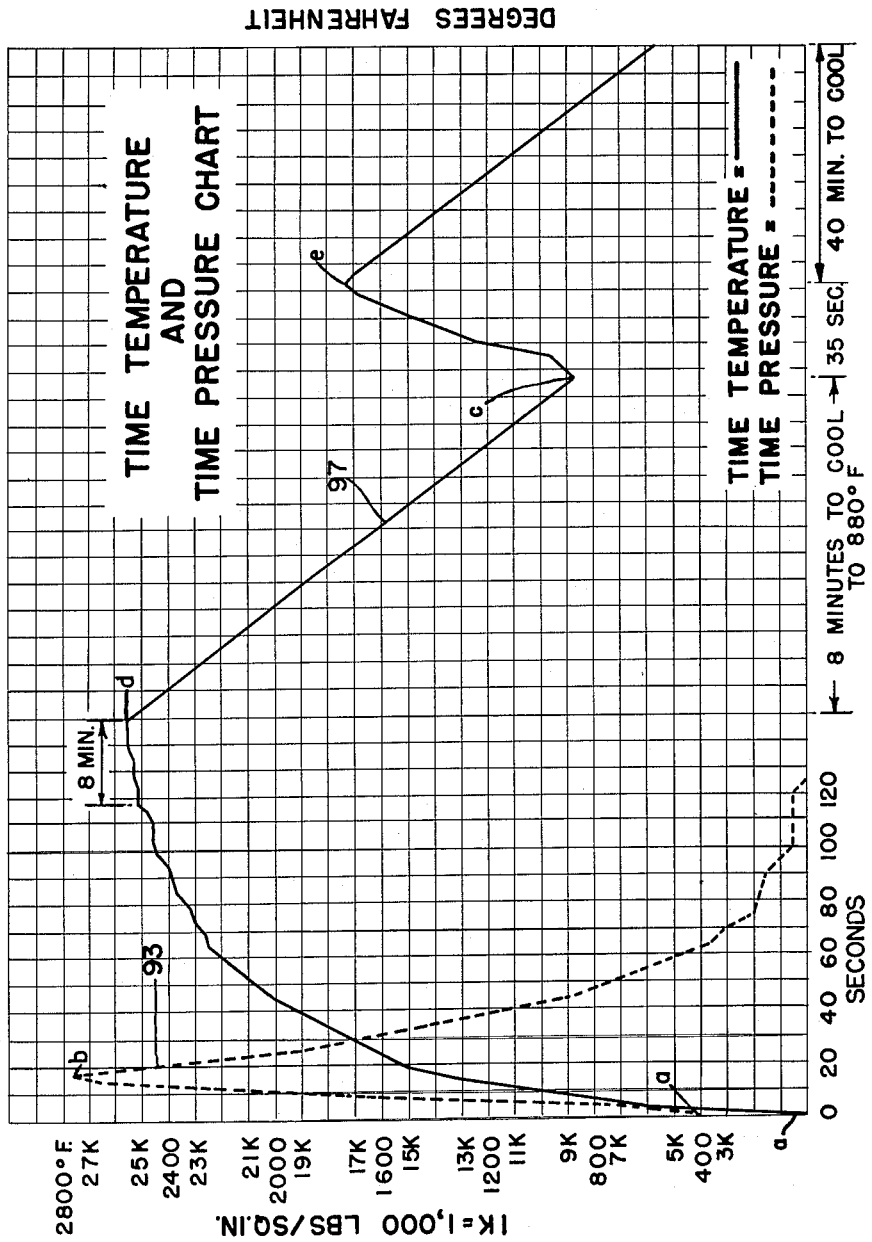
INVENTOR.
Bela Ronay
BY
Attorney

United States Patent Office 2,730,599
Patented Jan. 10, 1956

2,730,599

PRESSURE WELDING BY INDUCTION HEATING

Bela Ronay, Harundale, Glen Burnie, Md.

Application July 3, 1952, Serial No. 297,197

2 Claims. (Cl. 219—4)

(Granted under Title 35, U. S. Code (1952), sec. 266)

This is a continuation-in-part of Ser. No. 79,263, filed March 2, 1949, now abandoned.

This invention relates to pressure welding, with specific application to butt welding of tubes.

Butt welding of the tubes has heretofore been practiced under the following procedure. The tubes are roughly squared at the engaging ends and applied end to end under an initial pressure. Heat is then applied to the joint, as by a ring of oxy-acetylene torches, until the tube ends acquire a forging temperature. The butted zone is then upset by a second pressure application, and the joint sealed.

Welds made according to the pressure method as described are subject to numerous defects, including formation of blisters, decarburized areas in steels, annular fissures, folds and beads, and patches of unfused or oxidized metal. Also there is misalignment. In addition the secondary pressure application develops an internal and external upset where depth equals a major portion of the wall thickness of the tube.

The invention of this application in its broader aspects defines pressure welding as comprising: ends squared and finished to a smoothness not exceeding 50 millionths of an inch; providing means to bring the members to be joined in true alignment resulting in uniform pressure distribution throughout the cross-sectional area in contact; providing means to limit the initially applied pressure to specified values; prevent loss of alignment during the period the highly concentrated heat source is applied to the joint area; provide means for controlled cooling after the initial heat application or to repeat the heat cycle by raising the temperature of the joint area to the level sufficient to cause grain refinement.

In the conventional type butt-weld the upset is considerable and it is intentionally employed in an effort to compensate for the lack of alignment before and during the application of the welding heat. The expansion developing as the result of the localized heating tends to buckle the column-like members in abutment and tends to open up the joint at one area, unless the alignment, i. e. the distribution of the initial pressure is uniform throughout the abutting faces, and unless means are provided to ascertain that conditions during the period of expansion, which, with the members firmly held in the grips, automatically brings about pressure increase until the heated portion reaches the temperature at which the yield point of the material falls below the value of the stress developed by initial pressure application.

In the procedure characterized by this invention, upset occurs only during the period of heating to the above temperature range, therefore the total upset is limited and only occurs with the metal at the joint in the plastic state. Thus, development of folds, laps or cold shuts is automatically prevented.

The objects of the invention pertain primarily to the improvement of pressure type butt welds. A primary object is the elimination of protruding beads, blisters and like protuberances which interfere with tube capacity by establishing constructions. Another important object is to eliminate or prevent the formation of the areas of unfused metal and corresponding oxidation which weaken the joint. An object, also, is the provision of apparatus and a method of pressure welding wherein misalignment caused by excessive upset pressures at the joint is reduced or eliminated.

Another important object is the provision of means for confining the imparted heat to the immediate zone of the weld.

Other objects and many of the attendant advantages of this invention will be readily appreciated as the same becomes better understood by reference to the following detailed description when considered in connection with the accompanying drawings wherein:

Fig. 1 is an elevation partly in section of the welding apparatus of the invention;

Fig. 2 is a plan view of the apparatus of Fig. 1;

Fig. 3 is a section through the induction heating coil secondary showing the magnetic flux flow;

Fig. 4 is transverse section along lines 4—4 of Fig. 3;

Fig. 5 shows replicas of a photomicrograph of a segment of iron-base tubing after welding and before normalizing ($a$) and after normalizing ($b$);

Fig. 6 is a section through a pipe length including the completed weld, according to applicant's process;

Fig. 7 is a section through a pipe length according to prior methods showing beads, fissures and misalignment; and Fig. 8 is a graph showing variation of pressure with temperature and time in the weld zone.

On an extended base block 10 are mounted terminal stanchions 11 and 12. Stanchion 11 is formed of four flat plates, 13, 14, 15 and 16, edge welded together to form a square tube 17 with sides 13, 14 transverse to the base block 10. This tube is secured to a base plate 18 by means of welds 19 and side plates 20. The base plate 18 and intermediate spacer plate 21 are attached to the base block 10 by bolts 22.

Stanchion 12 is constructed of members parallel to those of stanchion 11 including the four tube plates 23, 24, 25 and 26 forming tube 27, the side plates 28, the base plate 29 and spacer 30.

Aligned apertures 31 are formed in stanchion tubes 17 and 27 adjacent the top thereof along a common axis parallel to the base block 10. Support tubes 35 and 36 are inserted respectively in the apertures 31 and 32 and welded to the aperture edges. Similarly, near the base of tubes 17 and 27 are formed axially aligned apertures 37 in which respectively are fixed, as by welding, support tubes 38 and 39. These support tubes 35, 36, 38 and 39 form support means for the work-piece clamps and the power mechanism.

Rod 40 is fixedly mounted in support tubes 35 and 36. The end sections 41 and 42 of the rod are smaller in diameter than the major rod section 43 in order to permit placement of the power and alignment nuts 44 and 45 on rod threads 46 and 47 respectively. Also in lower tube supports 38 and 39 is mounted rod 50 having smaller ends 51 and 52 fixed respectively inside supports 38 and 39 and having a central section 53 threaded at 54 and 55 to receive units 56 and 57.

The workpiece 60, formed of tube sections 61 and 62 is adapted for positioning between the support rods 40 and 50 in parallel relation thereto. To this end the support rods 17 and 27 are apertured with openings 63 and 64 respectively of sufficient size to receive tubes of various diameters. Considering, first, workpiece section 61, a tube 65 preferably single slit axially to impart resiliency, and having a snug fit, is slid over the workpiece to the indicated position near the tube end. This split tube is externally and uniformly tapered from an outer lesser diameter to an inner greater diameter. Over this split tube is placed a coengaging tube 66 having an internal taper reversed from that of tube 65. The outer tube 66 is fixed at its ends, as by welding, to transverse plates 67 and 68 forming opposite sides of a square tube 69 extending between and fixedly attached to tubes 70 and 71. Tubes 70 and 71 are mounted for slidable movement on rods 40 and 50 respectively.

Workpiece section 62 is supported by allochiral clamping and support means including the inner slit tapered clamp tube 73, the outer clamp tube 74 and the square tube 75 with transverse plates 76 and 77 attached to tubes 78 and 79, slidable respectively on rods 40 and 50.

The operation of the respective clamps follows from the construction. For workpiece section 61, the split clamp tube 65, having an inner diameter approximately the same as that of the outer diameter of the workpiece, is slipped thereon to a point such that when the tube is in position in the inter-engaging companion tube 66 the workpiece tip 80 is placed at the midpoint between the clamps. Clamp tube 73, is similarly placed on workpiece section 62. When so positioned, and with workpiece ends transverse to the pressure lines of the apparatus, on tightening of nuts 44 and 56 against slidable tubes 70 and 71 respectively, and on tightening of nuts 45 and 47 against slidable tubes 78 and 79, respectively, the outer clamp tubes are wedged against the inner split tubes 65 and 73 causing them to grip the workpiece sections. Further tightening of the nuts forces the workpiece sections together until the desired end-to-end pressure is secured. This pressure application is made at room temperature.

Since the end-to-end pressure is a critical condition in the procedure it is apparent that pressure indication means should be available to the operator. For this purpose any of the known mechanical, magnetic or electrical compression or strain indicators may be employed. As an example, there is illustrated in the drawing an electric strain gage of the type employing fine wire grids applied to a metal body subject to strain. Deformation of the metal body is transmitted to the wire, thereby varying its electrical resistance and causing an indication in a meter in a connected bridge circuit. Strain tubes are shown in the drawing at 81 and 82 in the shape of slidable spools interposed on shafts 49 and 50 between the nut 44 and slide tube 70 and between nut 56 and tube 71 respectively. Thus pressure applied by nuts 44 and 56 may be ascertained as to value and equalized to produce uniform effects at the workpiece tips. The strain gauge terminals are indicated at 83 and 84.

Heating means for the workpiece joint consists of a secondary copper tube 85 split axially and radially as indicated at 86 in Fig. 4 and having an inwardly projecting ridge or flange 87 closely overlying the joint tips 80 of the workpiece. A primary coil 88 from a suitable alternating current power source 89 encloses the secondary. The coil tube combination may be supported by a bracket attached to rod 43. Application of power induces circulatory currents in the secondary thereby increasing the effective reluctance of the secondary and concentrating the magnetic flux in the area included within the secondary flange 87. The important consideration here is that by use of the flange and a current frequency ranging from 960 cycles to between 300,000 and 500,000 cycles it is possible to provide a coupling with substantially uniform flux distribution at the workpiece ends 80 and a definite restriction on the heat application to a narrow zone including the workpiece tips. This axial restriction results from the narrow width of the secondary flange. This is of high importance in preventing plastic deformation beyond the region of the tip with resulting buckling of the workpiece. Thus the original alignment of the workpiece is assured. Reference is made to the flux lines 96 in Fig. 3.

Consideration may now be given to the complete method and to the apparatus, as a unit, in providing effective and sound pressure welds. The workpiece ends to be adjoined are first squared by machining and given the required finish. It is important that there be no furrows, pits or depressions producing an unevenness exceeding fifty millionth of an inch, as indicated by conventional equipment such as the Brush surface analyzer. The reason for this requirement lies in the fact that an appreciable depression occludes air which is trapped between the tightly butted workpiece ends and, in the presence of heat, oxidizes the surfaces. Consequently, after the weld step, unfused areas remain at the joint which is thereby appreciably weakened.

The workpiece sections are then inserted in clamp tubes 65 and 73 and placed end to end as shown in Fig. 1. Nuts 45 and 57 are then adjusted for equal and symmetrical back placement and nuts 44 and 56 tightened to produce the desired initial pressure at the tube tips, as indicated by the strain gage, or other pressure indicating means. This pressure will vary depending on the tube material, values from 1000 to 3000 lbs. per square inch being usable.

The power is then applied to the induction coil surrounding the joint. The current frequency selected will depend on the wall thickness, a higher frequency being suitable for thin walled tubes and a lower frequency for thick walled tubes. For example, for an iron-base 4 inch pipe having a wall thickness of 0.4375 inch a frequency around 9600 is appropriate. For a 2 inch pipe, with a wall thickness of 0.2187 inch, a ½ megacycle frequency is desirable. This arises from the skin effect phenomenon which increases with frequency and the important requirement that the joint faces 80 be uniformly heated. In other words the end sought in the heating step is uniform heat development at the joint faces with reduced extent of heating axially from the faces; and by the use of the flanged induction secondary and appropriate values of current and frequency this end is achieved and buckling due to one sided heating or extended heating along the axis is avoided. Moreover, it is assured that fusion develops completely around the joint periphery to seal the joint from air ingress and consequent oxidation and defect.

It is important in the process that only one pressure setting of the apparatus is made. Prior art methods utilize an upset step in which a second pressure is applied after fusion at the joint. As a result external and internal ridges are formed as shown at 90 and 91 in Fig. 7. Also misalignment results as well as fissures and grooves as shown at joint 92 of Fig. 7.

However, the pressure due to the fixed initial setting is not constant as appears from curve 93 of Fig. 8. This curve shows pressure variation at the workpiece tips due to temperature variation. In the section $a$—$b$ during the 1st time interval, the pressure increases to a peak $b$, many times the initial pressure, this peak value being considerably above the yield point for the material at that temperature. As fusion develops at the workpiece interfaces the pressure rapidly drops, as indicated by the falling curve section of 93, approaching zero. Thus the expansion of the material during heating is utilized to insure a close contact and sealing action of the thin layer of fused metal, the edge exudation of fused metal forming an edge seal which completely prevents air infiltration during the weld step. This is due to the fact that after the peak pressure has been developed it rapidly diminishes, precluding further deformation at the joint.

Following the weld heat, in the case of iron-base alloys, the joint is cooled to approximate room temperature and then a normalizing heat is applied. This step ordinarily is performed on the workpiece before removal of the weld members from the machine and comprises a reheat of the weld joint to a point above the critical temperature range but below the welding temperature followed by a cooling below said ranges. In the case of an iron-base alloy this treatment apparently (see Fig. 8)

serves to transmute the substantially ferritic structure of the weld band to the pearlite-ferrite mixture of the original structure. A typical time-temperature curve 97 is shown in Fig. 8 showing heat application for 10 minutes and the subsequent temperature drop after heating from point $d$ to point $c$ followed by the normalizing temperature rise to point $e$ and final drop to room temperature. Fig. 5 illustrates this transformation, Fig. 5a showing at 94 a reproduction of a photomicrograph of the weld band prior to normalizing and Fig. 5b a reproduction of the same area after this treatment. This figure brings out the effectiveness of the heat concentration to a narrow zone at the weld region.

Fig. 6 is illustrative of a pipe weld made in accordance with the above described procedure. As shown the weld is characterized by absence of ribs and fissures in the weld zone 95 and substantial uniformity of inner tube diameter.

Modification of the exact procedure and mechanism may be made in achieving the results above described. For example, while preferably the frequency of the current is modified with the tube wall thickness, variation in heat application may be secured by varying the coupling only. With a loose coupling and a corresponding low flux gradient greater uniformity of heat for thicker walled tubes may be secured. However, it is observed that accommodation of heat to wall thickness of tubing while desirable, is not essential, since by judicious timing either high frequency or close coupling may be used on thick walled tubes, allowing for time for heat equalization between the inner and outer surfaces at the weld joint. Moreover, restriction to inductive heating is not always required since a thin ring of high temperature torches, with proper timing, may serve to condition the metal properly for a sound weld. Torch heating, however, is not feasible where, in the time of heat treatment, the tube metal is deleteriously modified in structure or shape by conducted heat.

The invention has been described primarily in relation to butt welding of tubes. It is apparent, however, that the principles of the disclosure are equally applicable to the joining of solid rod ends or plate edges and that the workpiece need not necessarily be circular in cross section.

Obviously other modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In pressure welding equipment, two aligned supports, each adapted to hold fixedly a section of the workpiece in end to end contact with the section held by the other, and combined means for heating said workpiece ends and preventing buckling thereof when heat is applied to said ends, said combined means comprising a primary coil, an axially split secondary coil formed of a metal tube in inductive relationship to said primary coil, and a flange integral with said secondary coil and overlying said workpiece ends and the area immediately adjacent thereto, whereby fusion of the workpiece is restricted to the adjoining ends of the workpiece.

2. An induction heating apparatus, comprising a primary coil, and a secondary coil positioned in inductive relationship to said primary coil, said secondary coil being in the form of a tube having a single axial slit in the wall thereof and a transversely projecting flange of relatively narrow axial width, which flange is adapted to overlie the workpiece to be heated and to develop in said workpiece on supply of alternating current to said primary coil a heated band of a width approximately equal to that of said flange.

References Cited in the file of this patent

UNITED STATES PATENTS

| | | |
|---|---|---|
| 1,902,955 | Holmes | Mar. 28, 1933 |
| 2,151,035 | Kennedy | Mar. 21, 1939 |
| 2,183,078 | Kemler | Dec. 12, 1939 |
| 2,184,534 | Smith et al. | Dec. 26, 1939 |
| 2,231,027 | Renner | Feb. 11, 1941 |
| 2,237,551 | Darner | Apr. 8, 1941 |
| 2,276,354 | Trainer | Mar. 17, 1942 |
| 2,292,549 | Simmons | Aug. 11, 1942 |
| 2,344,939 | Bennett | Mar. 28, 1944 |
| 2,408,229 | Roberds | Sept. 24, 1946 |
| 2,415,912 | Scherl | Feb. 18, 1947 |
| 2,430,237 | Moncher | Nov. 4, 1947 |
| 2,459,971 | Stanton | Jan. 25, 1949 |

FOREIGN PATENTS

| | | |
|---|---|---|
| 71,335 | Norway | Dec. 9, 1946 |
| 585,999 | France | Dec. 20, 1924 |